Patented Sept. 1, 1931

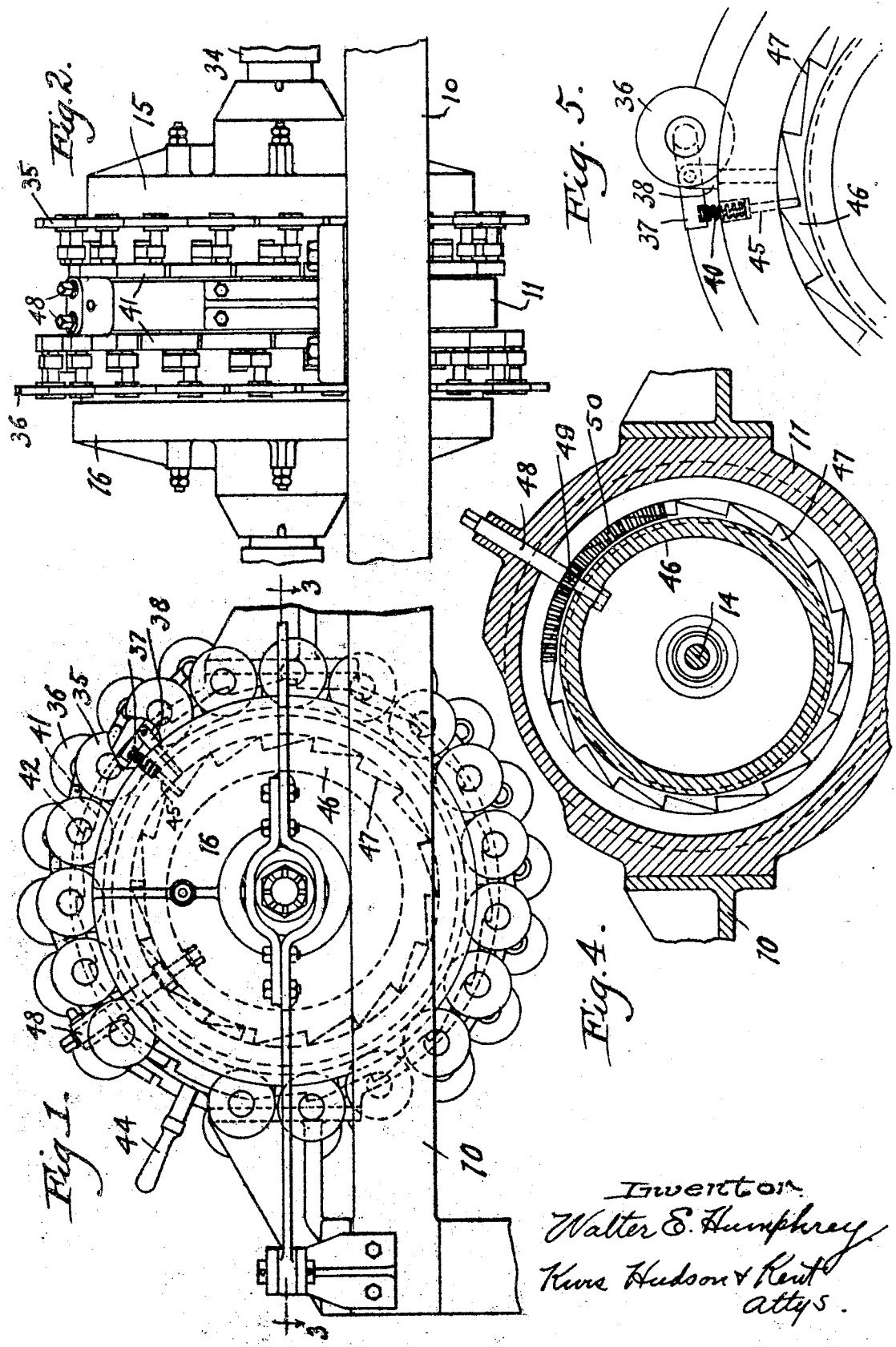

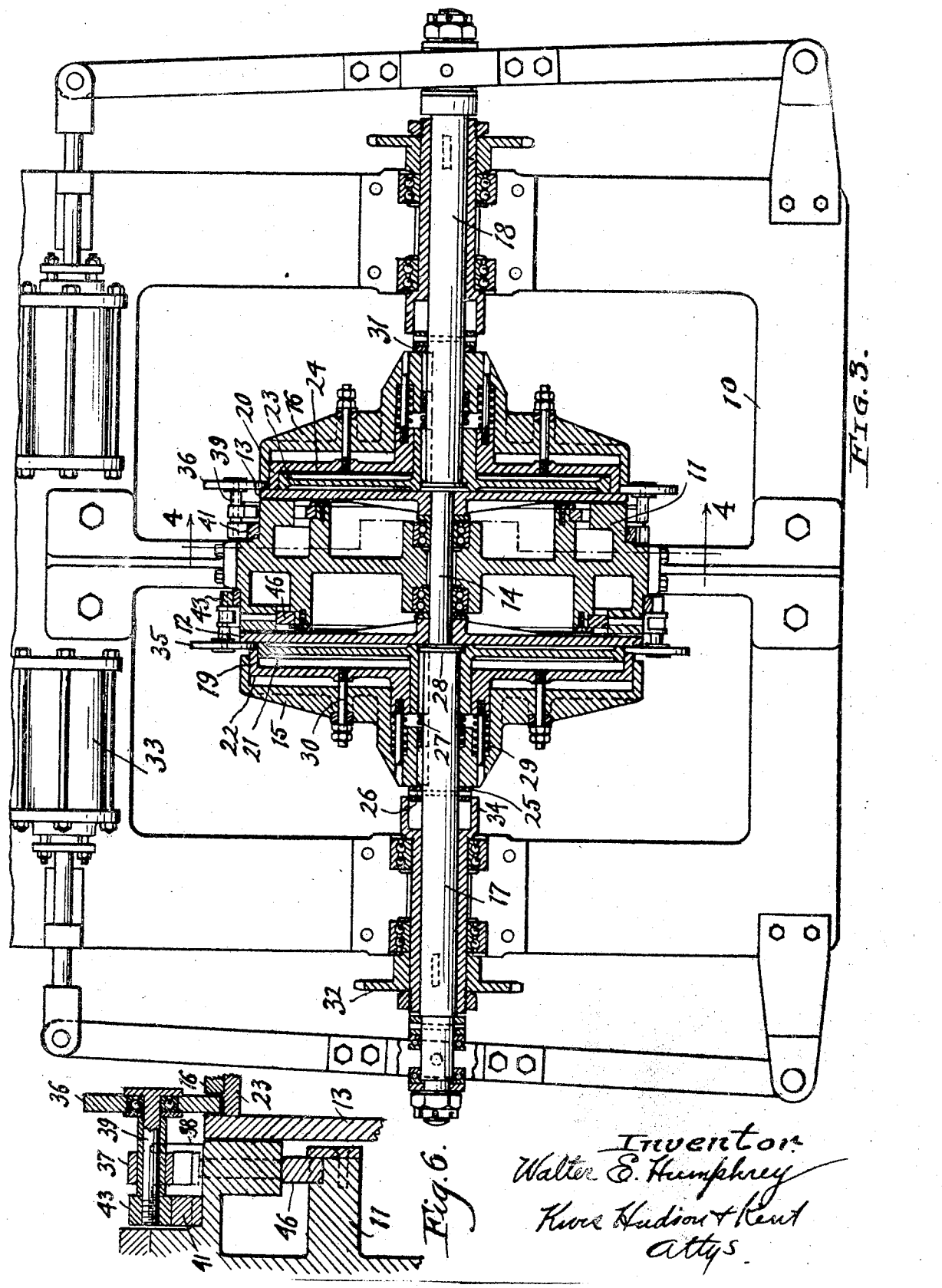

1,821,161

UNITED STATES PATENT OFFICE

WALTER E. HUMPHREY, OF JEANNETTE, PENNSYLVANIA, ASSIGNOR TO THE MASON TIRE & RUBBER CORP., OF KENT, OHIO, A CORPORATION OF OHIO

BEAD FORMING MACHINE

Application filed March 18, 1930. Serial No. 436,756.

This invention relates to apparatus for forming beads for pneumatic tires, and more particularly to apparatus of the type disclosed in my copending application, Serial No. 127,957, filed August 7, 1926, in which the beads are formed from a continuous strip of bead-forming material.

In operation a machine constructed according to the disclosure of said copending application forms tire beads of one given size or diameter. If beads are to be constructed of various diameters, it is necessary to either provide additional machines of this type having the parts thereof properly proportioned to produce the desired sizes, or to provide interchangeable parts which can be substituted in the machine to form the various bead sizes desired. The construction and maintenance of a plurality of such machines for making beads of various sizes, or the construction and substitution of interchangeable parts, represents an outlay of considerable expense.

It is therefore an object of this invention to provide improved bead-forming apparatus with which tire beads of different diameters may be rapidly and efficiently constructed.

Another object of this invention is to provide apparatus for forming tire beads in which the same set of pressure-applying rollers is used for shaping beads of different diameters.

A further object of this invention is to provide bead-forming apparatus in which the position and the pressure of the rollers may be adjusted according to the diameter of bead to be made.

The invention may be further briefly summarized as consisting in certain novel combinations and arrangements of parts hereinafter described and particularly set out in the appended claims.

In the accompanying sheets of drawings, Fig. 1 is a partial end elevational view of bead-forming mechanism embodying my invention;

Fig. 2 is a partial side elevational view thereof;

Fig. 3 is a sectional plan view taken on line 3—3 of Fig. 1;

Fig. 4 is a sectional elevation taken on line 4—4 of Fig. 3;

Fig. 5 is a detail elevational view showing the supporting and pressure-adjusting means for the rollers; and Fig. 6 is a fragmental sectional elevation showing the roller mounting.

The apparatus which I have shown, and to which I shall now refer in detail, operates upon strip material supplied thereto to form the beads of various diameters required by pneumatic tires of different rim sizes. This apparatus is provided with a supporting base 10 upon which the stationary body 11 is mounted. Discs 12 and 13 of different diameters are spaced slightly from the ends of the body, and are secured to opposite ends of the shaft 14 which is rotatably supported in the body. These discs form rotatable inner side-walls for the channels in which the bead-forming material is wound. Substantially cylindrical casing members 15 and 16 are rotatably supported in spaced relation respectively to the plates 12 and 13. These casing members are splined, respectively, to the shafts 17 and 18 which are rotatably mounted in the supporting base 10, and are aligned axially with the shaft 14. Adjacent the discs 12 and 13 I provide mandrels 19 and 20 upon which the material may be wound to form beads or ring-shaped structures of different sizes. The mandrel 19 comprises telescopically arranged drums 21 and 22 which are rotated by the shaft 17, and are mounted for axial movement relative to each other, and also for axial telescopic movement relative to the casing member 15. The outer faces of these rotatable drums provide cylindrical work-receiving surfaces of different diameters upon which the material may be wound and shaped to form beads of different diameters. The mandrel 20, adjacent the disc 13, likewise comprises drums 23 and 24 which are rotated by the shaft 18 and are mounted for axial telescopic movement relative to each other and relative to the casing member 16. The drums of the mandrels thus provide work-receiving surfaces upon which material may be selectively wound to form beads of four different diameters.

The opposite ends of the machine are composed of parts similarly arranged, and from this point of the description reference will be made to the left end only of the device as seen in Fig. 3. Casing member 15, which is splined to the shaft 17, is held against outward axial movement by means of the collar 25 which is secured to the shaft by the pin 26. A spring 27, interposed between the hub of the casing member and the hub of the drum 21, presses the drum inwardly against the disc 12 and against the collar or shoulder 28 on the inner end of the shaft, and also presses the casing member outwardly against the collar 25. Springs 29 interposed between the hub of the casing member and the hub of drum 22, likewise press this drum away from the casing member and toward the disc 12. The extent of movement of the drum 22, away from the casing member under the action of springs 29, may be initially regulated by the adjusting rods 30 so as to provide a work-receiving channel of proper width between this drum and the disc 12. With the parts arranged as shown in Fig. 3 the drum 21 is in position to receive bead-forming material upon its exposed outer surface to form a bead of a diameter corresponding to the diameter of this drum. If material is to be wound upon the surface of the drum 22 to form a bead of larger diameter than the bead formed on the drum 21, then a washer of suitable thickness, such as the washer 31 shown on the shaft 18, is inserted between the collar 25 and the hub of casing member 15 thus moving the drum 22 and the casing member inwardly to form a channel of proper width between this casing member and the disc 12.

During the winding operation the mandrel is rotated by a driving force applied to the sprocket 32 secured to the outer end of shaft 17. After sufficient material has been wound on the mandrel, axial movement is imparted to the shaft by means of fluid pressure supplied to the cylinder 33. This axial movement of the shaft causes the mandrel and casing member to move as a unit away from the disc 12. This separating movement provides space between the mandrel and the disc for ejecting a completed bead from the machine, and also accomplishes the stripping of the bead from the surface of the drum upon which it was wound. During this movement the collar 25 enters the sleeve 34, and after engagement of the hub of the casing member with the end of this sleeve, the casing member remains stationary while the drums 21 and 22 are telescopically retracted into the casing member against the action of the springs 27 and 29. The bead formed on the surface of drum 21 is thus stripped therefrom by the drum 22, and similarly a bead formed on the surface of drum 22 is stripped therefrom by the casing member 15. In a like manner beads of other diameters may be formed upon, and stripped from, the drums 23 and 24.

For the purpose of shaping the material which is wound upon the surfaces of the drums, I provide rows of pressure-applying rollers 35 and 36 which enter the channels in which the material is received and yieldingly engage the surface of this material. These pressure-applying rollers are arranged in spaced relation around the ends of the body 11, the row 35 being arranged to cooperate selectively with the drums 21 and 22, and the row 36 being arranged to cooperate selectively with the drums 23 and 24. These rollers are provided with movable supports 37 pivotally mounted in forked members 38 carried by the body 11. The rollers themselves are rotatably mounted upon shafts 39 carried at one end of the movable supports, while the opposite ends of these supports are engaged by springs 40 which cause the rollers to be yieldingly pressed into engagement with the material. For adjusting the radial position of the rollers to correspond with the diameter of the drum being used, I provide a circumferentially movable member 41 which is formed with inclined cam portions 42 adapted to engage heads 43 secured to extensions of the roller shafts. A suitable handle 44 is provided for adjusting the position of this movable member.

At the inner ends of the springs 40, which press the rollers into engagement with the material, I provide radial plungers 45 which extend into the body 11. For controlling the action of these springs, and for making adjustments of the pressure-applying means to correspond with the different radial positions which the rollers occupy, I provide a circumferentially movable member 46 which is mounted within the body portion and provided with inclined cam portons 47 for engagement with the inner ends of the plungers 45. For adjusting the position of this circumferentially movable member I provide a shaft 48 which extends into the body member and is provided at its inner end with a pinion 49 which engages a rack 50 carried upon the member 46.

It will now be readily seen that for making beads for tires of different rim sizes the positions of the casing members, and of the drums which form the mandrels, may be adjusted to provide work-receiving channels of proper diameters, and likewise, the pressure-applying rollers may be selectively adjusted radially for co-operation with the drums upon which the material is wound. It will also be seen that adjustment may be easily made so that the rollers will be pressed against the work with the desired yielding pressure corresponding with the radial position to which they have been adjusted.

The improved bead-forming apparatus which I have provided makes possible the construction of beads of various sizes upon one machine without the need of removing and substituting any parts, or without the need of rendering the machine inoperative for any appreciable length of time. As a result of my invention one machine may be kept in substantially continuous operation to supply the beads of different diameters required by tires of different rim sizes, instead of maintaining several machines in serviceable condition for intermittent and irregular operation, as has heretofore been necessary in supplying beads of different diameters.

While I have shown and described the device of my invention in a detailed manner, it should be understood, however, that I do not intend to limit myself to the precise details shown and described, but regard my invention as including such changes and modifications as do not involve a departure from the spirit of the invention and the scope of the appended claims.

Having thus described my invention, I claim:

1. In apparatus of the character described, the combination of a mandrel comprising a plurality of rotatable drums having work receiving surfaces upon which material may be wound to form ring-shaped structures of different diameters, and means peripherally associated with said mandrel for selectively applying pressure to material wound upon said drums.

2. In apparatus of the character described, the combination of a mandrel comprising a plurality of rotatable drums having work-receiving surfaces upon which material may be wound to form ring-shaped structures of different diameters, said drums being arranged in telescopic relation and for axial relative movement whereby the ring-shaped structure formed on one of said drums may be stripped therefrom by another of said drums, and means peripherally associated with said mandrel for selectively applying pressure to material wound upon said drums.

3. In apparatus of the character described, a mandrel comprising a plurality of rotatable drums having work-receiving surfaces upon which material may be wound to form ring-shaped structures of different diameters, said drums being arranged in telescopic relation for axial relative movement whereby the ring-shaped structure formed on one of said drums may be stripped therefrom by another of said drums.

4. In apparatus of the character described, the combination of a mandrel comprising a plurality of rotatable drums having work-receiving surfaces upon which material may be wound to form ring-shaped structures of different diameters, a plurality of rollers spaced circumferentially around said mandrel for engagement with said material, and means for selectively adjusting said rollers radially for co-operation with said drums.

5. In apparatus of the character described, the combination of a mandrel comprising a plurality of rotatable drums having work-receiving surfaces upon which material may be wound to form ring-shaped structures of different diameters, a plurality of rollers spaced circumferentially around said mandrel for engagement with said material, movable supports for said rollers, and circumferentially movable means engageable with said supports for selectively adjusting said rollers radially for co-operation with said drums.

6. In apparatus of the character described, the combination of a mandrel comprising a plurality of rotatable drums having work-receiving surfaces upon which material may be wound to form ring-shaped structures of different diameters, a plurality of rollers spaced circumferentially around said mandrel, movable supports for said rollers, means engaging said supports for resiliently pressing said rollers against the material, means engaging said supports for selectively adjusting said rollers radially for co-operation with said drums, and circumferentially movable means for correspondingly adjusting said pressing means.

7. In apparatus of the character described, the combination of a mandrel comprising a plurality of rotatable drums having work-receiving surfaces upon which material may be wound to form ring-shaped structures of different diameters, a plurality of rollers spaced circumferentially around said mandrel for engagement with said material, means for resiliently pressing said rollers against said material, means for adjusting the radial position of said rollers for co-operating with one of said drums, and means for correspondingly adjusting said pressing means.

8. In apparatus of the character described, the combination of a mandrel comprising a plurality of rotatable drums having work-receiving surfaces upon which material may be wound to form ring-shaped structures of different diameters, a plurality of rollers spaced circumferentially around said mandrel for engagement with said material, means for resiliently pressing said rollers against said material, means for adjusting the radial position of said rollers for co-operation with one of said drums, and means for correspondingly adjusting said pressing means, said last mentioned means including a circumferentially movable member, a rack carried by said member, and means for actuating said rack.

9. In apparatus of the character described, the combination of a support, a body carried by said support, a mandrel adjacent said body comprising a plurality of rotatable telescoping drums upon which material may be wound to form ring-shaped structures of different diameters, a plurality of rollers spaced circumferentially around said mandrel for engagement with said mandrel, movable supports for said rollers mounted on said body, springs engaging said supports for resiliently holding said rollers against said material, and means movable circumferentially of said body and having cam surfaces engageable with said supports for selectively adjusting said rollers radially for co-operation with said drums.

10. In apparatus of the character described, the combination of a support, a body carried by said support, a mandrel adjacent said body comprising a plurality of rotatable telescoping drums upon which material may be wound to form ring-shaped structures of different diameters, a plurality of rollers spaced circumferentially around said mandrel for engagement with said material, movable supports for said rollers mounted on said body, springs engaging said supports for resiliently holding said rollers against said material, means movable circumferentially of said body and having cam surfaces engageable with said supports for selectively adjusting said rollers radially for co-operation with said drums, plungers engaging said springs, and a second member movable circumferentially of said body and having cam surfaces engageable with said plungers for varying the action of said springs.

In testimony whereof, I hereunto affix my signature.

WALTER E. HUMPHREY.